United States Patent
Schmalzigaug et al.

(10) Patent No.: US 6,811,321 B1
(45) Date of Patent: Nov. 2, 2004

(54) OPTICAL CONNECTOR FOR SIMULTANEOUSLY CONNECTING A PLURALITY OF FIBER OPTICAL CABLES AND ADAPTER FOR SAID CONNECTOR

(75) Inventors: Thomas Schmalzigaug, St. Gallen (CH); Beat Koch, Waldstadt (CH)

(73) Assignee: Huber & Suhner AG, Herisau (CH)

( * ) Notice: Subject to any disclaimer, the term of this patent is extended or adjusted under 35 U.S.C. 154(b) by 0 days.

(21) Appl. No.: 10/182,545

(22) PCT Filed: Feb. 11, 2000

(86) PCT No.: PCT/CH00/00078
§ 371 (c)(1),
(2), (4) Date: Oct. 16, 2002

(87) PCT Pub. No.: WO01/59499
PCT Pub. Date: Aug. 16, 2001

(51) Int. Cl.[7] ................................................. G02B 6/38
(52) U.S. Cl. ............................. 385/59; 385/60; 385/53; 385/72; 385/75; 385/77; 385/78
(58) Field of Search ............................. 385/59, 60, 53, 385/72, 75, 77, 78

(56) References Cited

U.S. PATENT DOCUMENTS

| | | |
|---|---|---|
| 4,953,941 A | 9/1990 | Takahashi |
| 5,287,425 A | 2/1994 | Chang |
| 5,343,547 A | 8/1994 | Palecek et al. |
| 5,436,993 A | 7/1995 | Antonini et al. |
| 5,528,712 A | 6/1996 | Belenkiy et al. |
| 5,581,645 A | 12/1996 | Gehri |
| 5,590,229 A | 12/1996 | Goldman et al. |
| 5,727,101 A | 3/1998 | Giebel et al. |
| 5,799,122 A | 8/1998 | Jeong et al. |
| 5,896,479 A | 4/1999 | Vladic |
| 5,953,475 A | 9/1999 | Beier et al. |
| 5,984,531 A | * 11/1999 | Lu ................................ 385/60 |

FOREIGN PATENT DOCUMENTS

| | | |
|---|---|---|
| EP | 0 061 243 A1 | 9/1982 |
| EP | 0 430 107 A2 | 6/1991 |
| JP | 59148019 | 8/1984 |
| WO | WO-00/16145 A1 | 3/2000 |

* cited by examiner

Primary Examiner—Dean A. Reichard
Assistant Examiner—Jinhee Lee
(74) Attorney, Agent, or Firm—Tarolli, Sundheim, Covell & Tummino L.L.P.

(57) ABSTRACT

An optical connection (10) simultaneously connects a plurality of fiber optical cables (17, 18). The optical connection (10) has at least one plug (10A) in which a number of ferrules corresponding to the number of fiber optical cables (17) to be connected are mounted with spring-back effect in the direction of connection. Each of the fiber optical cables (17) to be connected ends in a corresponding ferrule and is fixed thereto. Each ferrule is mounted with spring-back effect in a separate adapter (20) and the adapters (20) are disposed and fixed next to one another inside a common housing (19') of the at least one plug (10A).

14 Claims, 4 Drawing Sheets

OPTICAL CONNECTOR FOR SIMULTANEOUSLY CONNECTING A PLURALITY OF FIBER OPTICAL CABLES AND ADAPTER FOR SAID CONNECTOR

TECHNICAL FIELD

The present invention relates to the field of fiber optics. It concerns an optical plug-in connector for simultaneously connecting a plurality of fiber-optic cables according to the precharacterizing clause of claim 1 and also an insert for such a plug-in connector.

Such a plug-in connector is known for example from the printed publications U.S. Pat. No. 5,436,993 or U.S. Pat. No. 5,590,229.

PRIOR ART

On account of their high transmission capacity and their immanent interference immunity, fiber-optic networks are being used increasingly in various technical areas, such as for example the communications infrastructure of buildings and the like. The reliable and easy-to-handle, releasable connection between different fiber-optic cables by means of optical plug-in connectors is of decisive significance in this respect. Since the complexity of the communication tasks is constantly growing, it is required for an ever-increasing number of cables to be connected to one another and, correspondingly, for an ever-increasing number of such plug-in connections to be accommodated in a confined space. This is the case in particular when, for reasons of capacity, a plurality of parallel cables are used instead of one cable and correspondingly have to be simultaneously connected.

A very simple method of changing over from a single (simplex) plug-in connection to a double (duplex) plug-in connection is to combine two conventional simplex plug-in connectors with suitable connecting means to form a duplex plug-in connector. Examples of such a solution are disclosed in U.S. Pat. No. 5,528,712 or U.S. Pat. No. 5,343,547. Although such a duplex plug-in connector has the advantage that it can be constructed in a very simple way from already existing simplex plug-in connectors, it is disadvantageous that, with plug-in connectors of this type, no space is saved, instead it just being ensured that two otherwise unchanged simplex plug-in connectors are actuated simultaneously.

On the other hand, there have already been a number of proposals for very compact, space-saving optical multiple plug-in connectors in which the fibers of a plurality of fiber-optic cables or multifiber cables end in a single ferrule of a plug-in connector and are correspondingly connected simultaneously when the plug-in connector is actuated. In U.S. Pat. No. 5,727,101, the one cylindrical ferrule of the plug-in connector contains two central bores for receiving two optical fibers. In U.S. Pat. No. 5,799,122 there is provided a flat ferrule of rectangular cross section, in which a plurality of bores for receiving fiber ends are arranged next to one another in a row. In U.S. Pat. No. 5,896,479, use is likewise made of a flat, substantially rectangular ferrule, which is divided into two separable halves, on each of which parallel, V-shaped grooves are provided for receiving the fiber ends. With multiple plug-in connectors of this type, a multiplicity of individual optical fibers can be connected in a confined space. However, disadvantages are the comparatively complex fitting of the fiber ends in the ferrules and a lack of flexibility in use, because the ferrules are in each case made individually for a specific number of fibers. In addition, it is disadvantageous in the case of the solutions with the V-shaped grooves that the fibers cannot be centered very easily in comparison with the prior-art solutions described below (known as the ferrule-sleeve-ferrule systems).

A further solution for multiple plug-in connectors is described in the printed publications cited at the beginning U.S. Pat. No. 5,590,229 and U.S. Pat. No. 5,436,993. In the case of this solution, based on a ferrule-sleeve-ferrule system, each individual fiber of the plug-in connector is inserted into a ferrule of its own. The various ferrules—individually sprung—are mounted and held in a common carrier body (88, 90 in FIG. 4 of U.S. Pat. No. 5,590,229 and 31 in U.S. Pat. No. 5,436,993). Although in the case of this solution the fitting of the optical fiber ends in the ferrules is much easier than in the aforementioned ferrules with multiple bores, here, too, the flexibility which is advantageous in many cases is lacking, because the carrier bodies are in each case made individually for a specific number of ferrules or fibers.

SUMMARY OF THE INVENTION

It is therefore an object of the invention to provide a compact optical plug-in connector for simultaneously connecting a plurality of fiber-optic cables which avoids the disadvantages of the known solutions and is distinguished in particular by easy fitting of the optical fibers and great flexibility in use.

The object is achieved by the features of claims 1 and 13 in their entirety. The essence of the invention is to provide individual sprung ferrules for each of the fibers, to preassemble these sprung ferrules in separate inserts and, for forming a multiple plug-in connector, to accommodate a plurality of these inserts next to one another in a common housing. By the use of individual ferrules, the fitting of the fiber ends is made easier and at the same time a high centering accuracy of the fibers is achieved. The preassembly of the ferrules in separate inserts achieves improved flexibility, because different numbers of inserts can be combined in a simple way to form a plug-in connector. On account of the preassembled inserts, it is possible to dispense with intermediate or parting walls between the inserts in the housing.

A first preferred refinement of the invention is characterized in that the inserts are releasably fastened in the common housing, and that the inserts are fastened in the common housing with snap-in engagement. As a result, simplified mounting and removal of the inserts is made possible, accompanied at the same time by a stable construction of the plug-in connection.

A second preferred refinement of the plug-in connector according to the invention is distinguished by the fact that the inserts respectively have a securing means, preferably consisting of a plastic, in the form of a rectangular frame, which is elongate in the plugging direction, encloses an inner space and in the front side of which an opening is provided for the ferrule and in the rear side of which a through-bore is provided for leading the fiber-optic cable through, that, for the spring-mounting of the ferrule, a spring element, in particular in the form of a helical spring, is mounted in the inner space of the securing means, that the ferrule is inserted into an inner part, which is arranged in the inner space of the securing means and preferably consists of a metal, that the inner part has a guide sleeve for guiding the spring element, and that means which permit an adjustment of the inner part by rotation about its longitudinal axis into different angular positions are provided on the inner part. It is preferred for the adjusting means to comprise an adjusting portion of square cross section, which adjoins the guide sleeve in the front region of the inner part and has a receiving bore for receiving the ferrule, and on which the spring element is supported with its front end. As a result, a stable and adjustable sprung mounting of the ferrule in the insert is achieved with few components.

According to a further refinement, the releasable and snap-engaging securement of the inserts in the housing can be realized particularly simply if, in the case of the securing means, a side wall in each case has a resilient portion with an engagement step arranged on it, and if snap-in openings into which the securing means engage with their engagement steps when the inserts are pushed into the housing are provided in the common housing.

A preferred refinement of the inserts according to the invention is characterized in that the ferrule is inserted into an inner part, which is arranged in the inner space of the securing means and preferably consists of a metal, that the inner part has a guide sleeve for guiding the spring element, that means which permit an adjustment of the inner part by rotation about its longitudinal axis into different angular positions are provided on the inner part, and that the adjusting means comprise an adjusting portion of square cross section, which adjoins the guide sleeve in the front region of the inner part and has a receiving bore for receiving the ferrule, and on which the spring element is supported with its front end.

Further embodiments emerge from the dependent claims.

BRIEF EXPLANATION OF THE FIGURES

The invention is to be explained in more detail below on the basis of exemplary embodiments in conjunction with the drawing, in which.

WAYS OF IMPLEMENTING THE INVENTION

Figure 1:
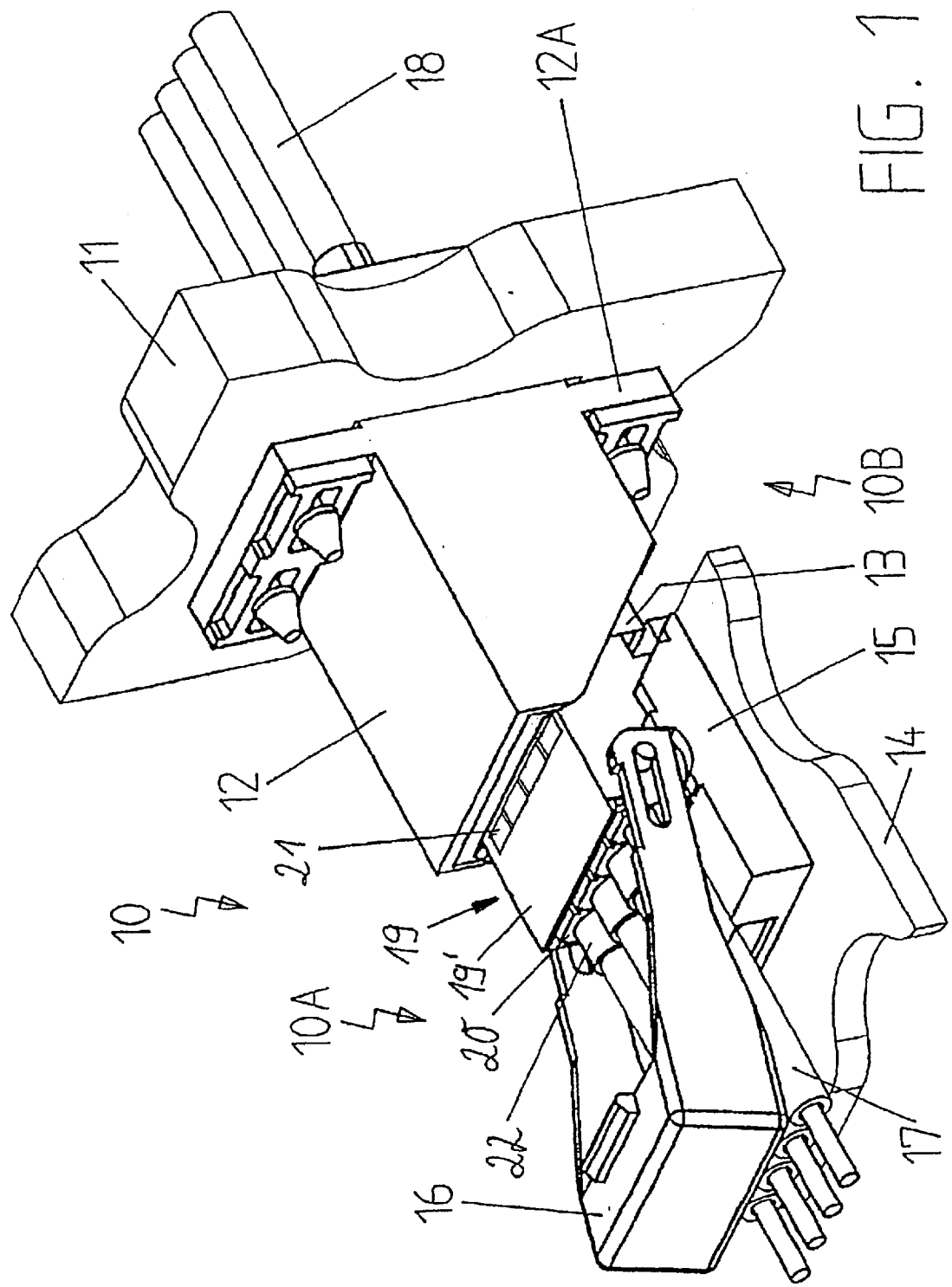
FIG. 1 shows in a perspective side view a preferred exemplary embodiment of a plug-in connector according to the invention in the form of what is known as a "backplane connector", in which (four) fiber-optic cables of a circuit board are connected by means of a plug and a socket to corresponding cables of a mounting backplane.

In FIG. 1, a preferred exemplary embodiment of a plug-in connector according to the invention in the form of what is known as a "backplane connector" is reproduced in a perspective side view. In the present example, the optical plug-in connector 10, represented in the plugged-in state, releasably connects four fiber-optic cables 17 arranged next to one another of a circuit board ("board") 14 to four corresponding optical cables 18, which lead away outward from a mounting backplane ("backplane") 11. The circuit board 14 is in this case oriented at right angles to the mounting backplane 11. The optical plug-in connector 10 comprises a plug 10A, fixedly mounted on the edge of the circuit board 11, and, matching the plug, [lacuna] socket 10B, with an inner housing 13, which is mounted displaceably in the plugging direction in an outer housing 12. The outer housing 12 is in this case fastened (for example screwed) by means of a flange 12A in an opening in the mounting backplane 11. The plug 10A has a body 15, which merges at one end with a plug-in part 19. With this plug-in part 19, it plugs into a corresponding plug-in opening of the socket 10B. The plug 10A and the ends of the fiber-optic cables 17 located therein can be protected against soiling or damage and secured to prevent unintentional escape of radiation by a protective flap 16, which is swivel-mounted on the body 15 and is swiveled back to the rear before plugging-in.

Figure 2:
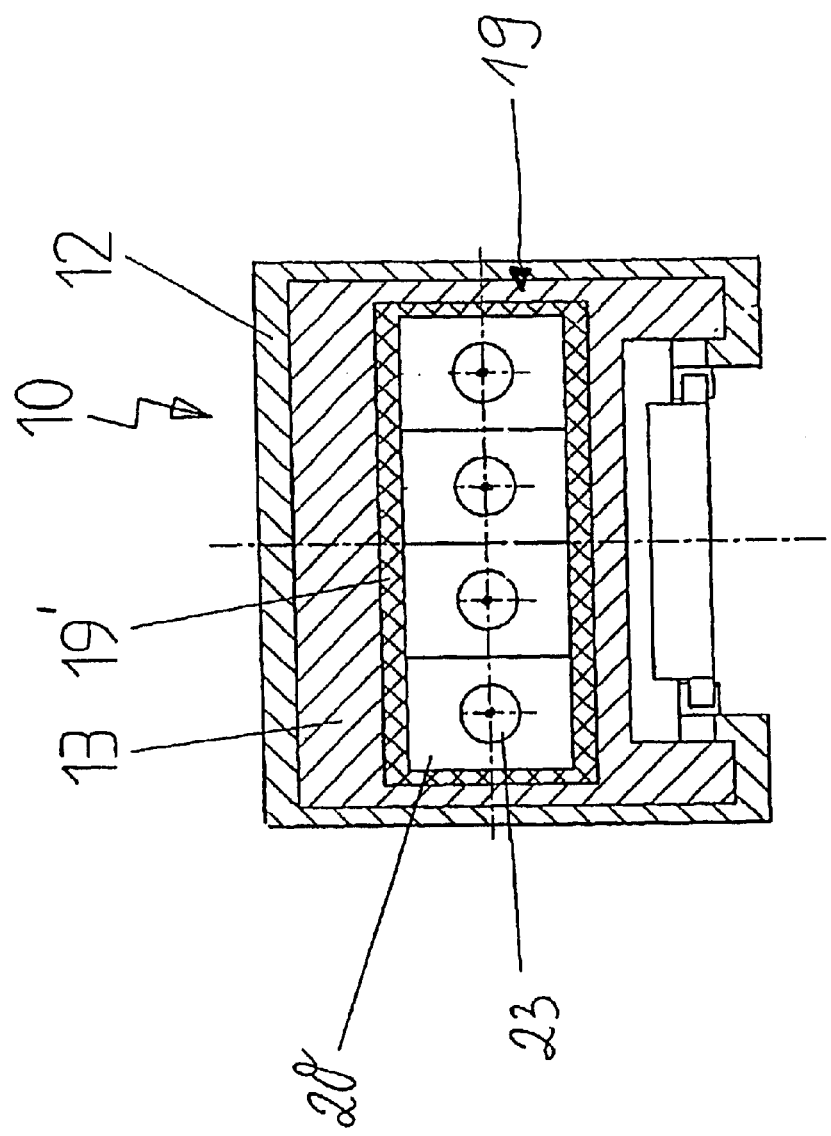
FIG. 2 shows in cross section the plug according to FIG. 1 inserted into the socket, with its four inserts and ferrules arranged in series next to one another.

According to the invention, each of the four fiber-optic cables 17 within the plug 10A or the plug-in part 19 is assigned an independent insert 20, which contains the associated sprung ferrule for the fastening of the free fiber end and is held together with the other identical inserts in snap-in engagement in a common housing 19' of the plug-in part 19. For the purpose of the snap-in engagement, four snap-in openings 21 are provided next to one another on the upper side of the housing in the example of FIG. 1. The position of the inserts 20 with their ferrules 23 in the housing 19' can be seen from FIG. 2.

Figure 3:
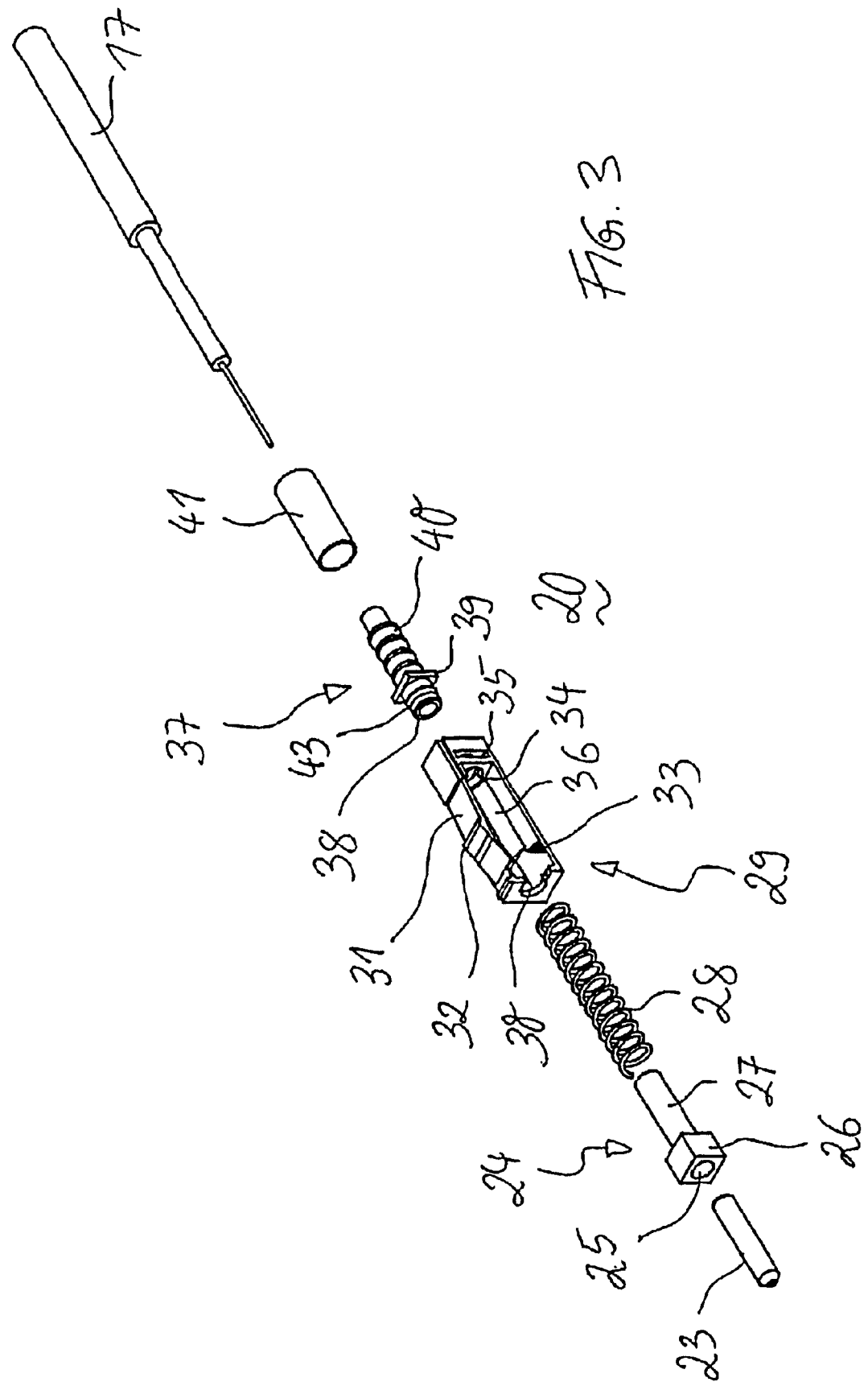
FIG. 3 shows in a perspective exploded representation, seen obliquely from the front, the construction of an insert, as used in the example of FIG. 1.
Figure 4:
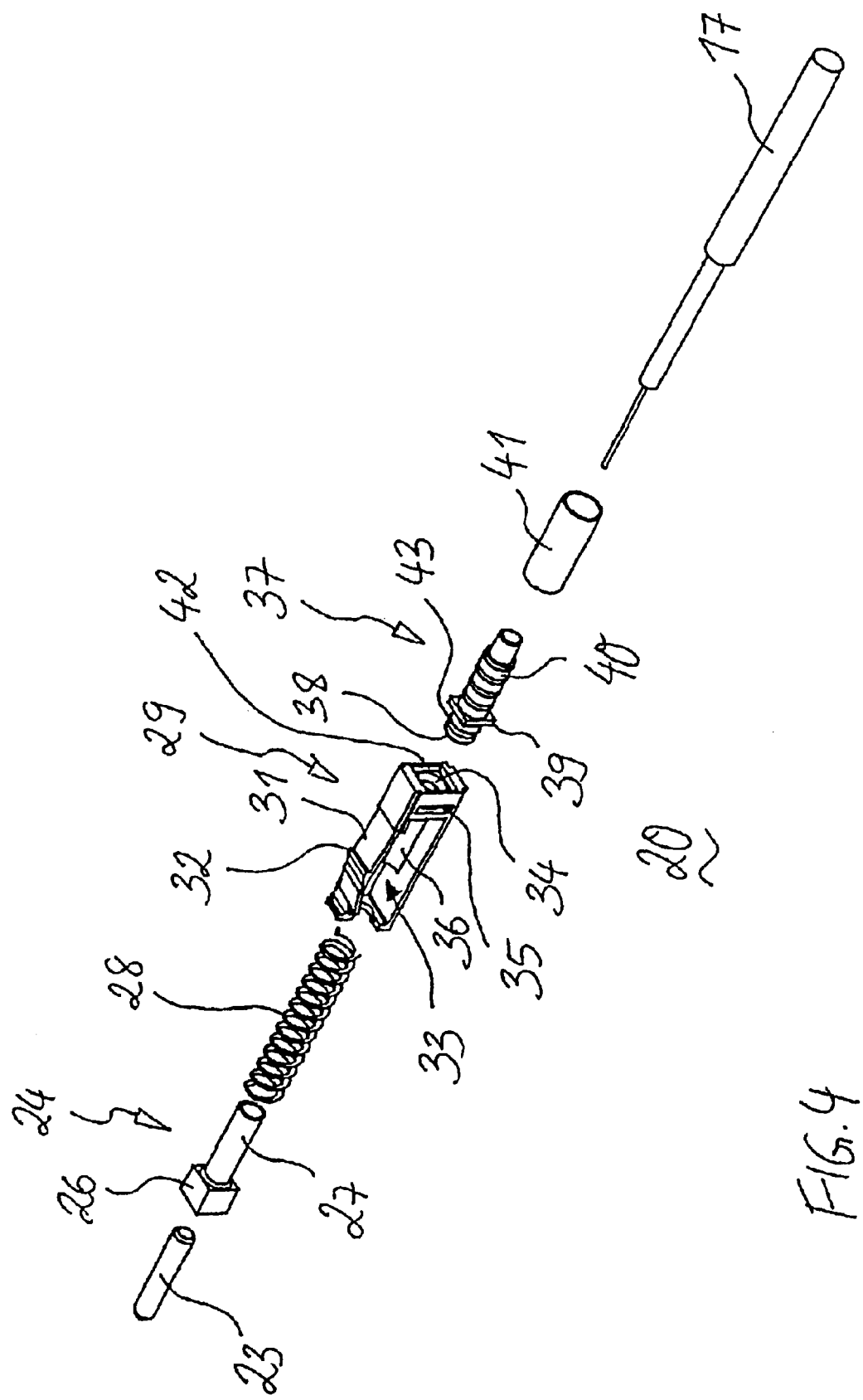
FIG. 4 shows the insert according to FIG. 3, seen obliquely from the rear.

According to FIGS. 3 and 4, an individual preassemblable insert 20 comprises the ferrule 23 (material: for example zirconia; diameter: for example 1.25 mm), an inner part 24 (of metal), a spring element 28 in the form of a helical spring, a frame-shaped securing means 29 (injection-molded part of plastic), a crimping neck 37 (of metal) and a crimping sleeve 41 (likewise of metal). It goes without saying that, instead of the helical spring, some other spring element, for example a rubber tube, may also be used. The securing means 29 forms the basic component of the insert 20 and gives the insert 20 the necessary mechanical stability. The remaining components 23, 24, 28, 37 and 41 are accommodated in the securing means 29 or attached to the securing means 29. The securing means 29 has the form of a rectangular frame, which is elongate in the plugging direction and encloses an inner space 33. In the front wall (front side) of the frame, an opening 30 for the ferrule 23 is provided. Provided in the rear wall (rear side) is a through-bore 34 for leading the fiber-optic cable 17 through, and a rectangular receiving space 35. Arranged on the outer side of the rear wall is a square clearance 42 (FIG. 4).

The crimping neck 37 comprises a square holding plate 39, which is adjoined at the front and rear in the axial direction in each case by a pipe connecting piece 38 and 40, respectively. The front pipe connecting piece 38 additionally bears a concentric annular bead 43. When the crimping neck 37 is pressed into the through-bore 34 of the securing means 29, the pipe piece 38 engages with its annular bead 43 in the receiving space 35. At the same time, the holding plate 39 comes to lie in the clearance 42 and in this way secures the crimping neck 37, pressed into the securing means 29, against being twisted by a torsional force acting on the cable 17. The front pipe connecting piece 38, protruding into the inner space 33 when the crimping neck 37 is in its pressed-in state, serves for supporting the helical spring 28 inserted into the inner space 33. The rear pipe connecting piece 40, protruding rearward out of the securing means 29, serves for securing the tension relief of the fiber-optic cable 17 by means of the crimping sleeve 41 pushed over it and subsequently pressed.

The ferrule 23, the inner part 24 and the helical spring 28 are mounted in the inner space 33 of the securing means 29. The inner part 24 comprises a guide sleeve 29 for guiding the helical spring 28 and also an adjusting portion 26 of square cross section. The adjusting portion 26 adjoins in the front region of the inner part 24 the guide sleeve 27 and has a receiving bore 25 for receiving the ferrule 23. The helical spring 28, pulled over the guide sleeve 27, is supported with its front end on the rear side of the adjusting portion 26. The ferrule 23 is pressed into the receiving bore 25 on the inner part 24 and inserted together with the inner part 24 and the pushed-on helical spring 28 from the open side of the securing means into the inner space 33. In order that the ferrule 23 can assume its place in the front opening 30 unhindered, this opening 30 is formed such that it is open to the side. The interplay between the square adjusting portion 26 and the rectangular inner space 33 permits an adjustment of the inner part 24 (or of the fiber) by rotation about its longitudinal axis into different angular positions (in 4 steps of 90° in each case). The helical spring 28 thereby presses the inner part against the front side of the securing means 29, so that the adjusted position can be retained. To give the helical spring 28 additional lateral retention in the inner space 33, elongate delimiting elements 36 may be formed onto the inner side of the longitudinal walls of the securing means.

However, instead of the rectangular or square configuration with its adjustability in 90° steps, it is also conceivable to provide, for example, a hexagonal configuration with an adjustability in 60° steps. The inserts could then correspondingly have a hexagonal cross-sectional profile and then be arranged next to one another and one above the other in a kind of honeycomb structure, in order in this way for example to optimally fill a circular housing of a plug-in connector.

In order that the inserts 20 can be inserted into the common housing 19' with snap-in engagement, in the case of each securing means 29 the upper-lying side wall in each case has a resilient portion 31 protruding outward in a slightly V-shaped manner, with an engagement step 32 arranged on it, which releasably engages in the associated snap-in opening 21 on the housing 19' when the insert 20 is pushed in. By pressing down the engagement step 32, the insert 20 can then be pulled out again rearward from the housing 19'.

The minimal dimensions of all the components allow optimum series arrangement with the insert 20. The securing means 29 may additionally have at the front on the inner side a draft (bevel) (not shown in FIG. 3), so that, although the inner part 24 has play, it is kept pressed by the helical spring into the bevel absolutely without play. With the snap-in device 31, 32, the securing means 29, and consequently the entire insert 20, can be plugged into a housing 19' of virtually any desired design, so that multiple connections are possible with only one plug housing of any desired variation.

The invention has been explained above on the basis of the example of a "backplane connector", in which there is a plug ("male") and a socket ("female"). It goes without saying that the concept according to the invention is also and specifically suitable for plug-in connectors which—as represented in U.S. Pat. No. 5,436,993—comprise two identical plugs and a coupling lying in between (ferrule-sleeve-ferrule system).

List of Designations 10 optical plug-in connector
10A plug
10B socket
11 mounting backplane
12 outer housing (socket)
12A flange
13 inner housing (socket)
14 circuit board
15 body (plug)
16 protective flap (plug)
17, 18 fiber-optic cable
19 plug-in part
19' housing (plug-in part)
20 insert
21 snap-in opening
22 crimping sleeve
23 ferrule
24 inner part
25 receiving bore
26 adjusting portion (square)
27 guide sleeve
28 spring element or helical spring
29 securing means (frame-shaped)
30 opening
31 resilient portion
32 engagement step
33 inner space
34 through-bore
35 receiving space (rectangular)
36 delimiting element
37 crimping neck
38, 40 pipe-connecting piece
39 holding plate
41 crimping sleeve
42 clearance (square)
43 annular bead

What is claimed is:

1. An optical plug-in connector (10) for simultaneously connecting a plurality of fiber-optic cables (17, 18), comprising at least one plug (10A), in which a number of ferrules (23) corresponding to the number of fiber-optic cables (17) to be connected are mounted such that each of the ferrules spring back in the plugging direction, each of the fiber-optic cables (17) to be connected ending with its optical fiber in the associated ferrule whereby each of the ferrules (23) is mounted in a springing-back manner in an insert (20), each insert (20) within the at least one plug (10A) being arranged next to one another and fixed in a common housing (19'), each insert (20) having a securing means (29) in the form of a rectangular, laterally open frame which is elongate in the plugging direction and which encloses an inner space (33), the frame having an opening (30) in a front side for each of the ferrules (23) and a through-bore (34) in a rear side for each fiber-optic cable (17), and a spring element (28) for spring-mounting each of the ferrules (23) in the inner space (33) of the securing means (29) of the insert (20).

2. The optical plug-in connector as claimed in claim 1, characterized in that the inserts (20) are releasably fixed in the common housing (19').

3. The optical plug-in connector as claimed in claim 2, characterized in that the inserts (20) are fixed in the common housing (19') with snap-in engagement.

4. The optical plug-in connector as claimed in claim 1, characterized in that the inserts (20) are arranged next to one another in a row in the common housing (19').

5. The optical plug-in connector as claimed in claim 1, further comprising a socket (10B) into which the plug (10A) is inserted.

6. The optical plug-in connector as claimed in claim 1 characterized in that, in the frame of the securing means (29), a side wall in the frame has a resilient portion (31) with an engagement step (32) arranged on it, and snap-in openings (21) are provided in the common housing (19') into which the securing means (29) engage with their engagement steps (32) when the inserts (20) are pushed into the common housing (19').

7. The optical plug-in connector as claimed in claim 1, characterized in that, for fastening the fiber-optic cable (17) on the securing means (29), there is provided a crimping neck (37), preferably consisting of a metal, which can be pressed with snap-in engagement into the through-bore (34) of the securing means (29) and has a pipe connecting piece (40), protruding rearward from the securing means (29), for fastening a crimping sleeve (41).

8. The optical plug-in connector as claimed in claim 1, characterized in that, to simplify the mounting, the opening (30) in the front side of the securing means (29) for receiving each of the ferrules (23) is open to the side such that each of the ferrules (23) can be inserted into the opening (30) from the open side.

9. The optical plug-in connector as claimed in claim 1, characterized in that each of the ferrules (23) is inserted into an inner part (24) which is arranged in the inner space (33) of the securing means (29) and preferably consists of a metal, in that the inner part (24) has a guide sleeve (27) for guiding the spring element (28) and in that an adjusting means (26) permits an adjustment of the inner part (24) by rotation about its longitudinal axis into different angular positions are provided.

10. The optical plug-in connector as claimed in claim 9, characterized in that the adjusting means comprises an adjusting portion (26) of square cross section, which adjoins the guide sleeve (27) in-the front region of the inner part (24) and has a receiving bore (25) for receiving each of the ferrules (23) and on which the spring element (28) is supported with its front end.

11. An insert for an optical plug-in connector (10) for simultaneously connecting a plurality of fiber-optic cables (17, 18), comprising at least one plug (10A), in which a number of ferrules (23) corresponding to the number of fiber-optic cables (17) to be connected are mounted such that each of the ferrules spring back in the plugging direction, each of the fiber-optic cables (17) to be connected ending with its optical fiber in an the associated ferrule and being fastened there, whereby each of the ferrules (23) is mounted in a springing-back manner in an insert (20), each insert (20) within the at least one plug (10A) being arranged next to one another and fixed in a common housing (19'), each insert (20) having a securing means (29) in the form of a rectangular, laterally open frame, which is elongate in the plugging direction and which frame encloses an inner space (33), and the frame having an opening (30) in a front side for each of the ferrules (23) a through-bore (34) in a rear side for the fiber-optic cable (17), and a spring element (28) for spring-mounting of each of the ferrules (23) in the inner space (33) of the securing means (29) of the insert (20).

12. The insert as claimed in claim 11, characterized that each of the ferrules (23) is inserted into an inner part (24), which is arranged in the inner space (33) of the securing means (29) and consists of a metal, in that the inner part (24) has a guide sleeve (27) for guiding the spring element (28), and in that adjusting means (26) permits an adjustment of the inner part (24) by rotation about its longitudinal axis into different angular position are provided.

13. The insert as claims in claim 12 characterized in that the adjusting means comprise an adjusting portion (26) of square cross section, which adjoins the guide sleeve (27) in the front region of the inner part (24) and has a receiving bore (25) for receiving each of the ferrules (23) and on which the spring element (28) is supported with its front end.

14. The insert as claimed in claim 11, characterized in that, for fastening the fiber-optic cable (17) on the securing means (29), there is provided a crimping neck (37), consisting of metal, which can be pressed with snap-in engagement into the through-bore (34) of the securing means (29), and has a pipe connecting piece (40), protruding rearward from the securing means (29), for fastening a crimping sleeve (41).

\* \* \* \* \*